(12) United States Patent
Paxman

(10) Patent No.: US 10,152,802 B2
(45) Date of Patent: Dec. 11, 2018

(54) METHOD AND APPARATUS FOR IMAGING THE SILHOUETTE OF AN OBJECT OCCLUDING A LIGHT SOURCE USING A SYNTHETIC APERATURE

(71) Applicant: MDA Information Systems LLC, Gaithersburg, MD (US)

(72) Inventor: Richard G. Paxman, Saline, MI (US)

(73) Assignee: Radiant Geospatial Solutions LLC, Wilmington, DE (US)

( * ) Notice: Subject to any disclaimer, the term of this patent is extended or adjusted under 35 U.S.C. 154(b) by 81 days.

(21) Appl. No.: 15/488,918

(22) Filed: Apr. 17, 2017

(65) Prior Publication Data

US 2017/0287153 A1 Oct. 5, 2017

Related U.S. Application Data

(63) Continuation-in-part of application No. 15/475,769, filed on Mar. 31, 2017.
(Continued)

(51) Int. Cl.
*G06K 9/00* (2006.01)
*G06T 7/579* (2017.01)
*G01J 1/44* (2006.01)
*H04N 5/30* (2006.01)
*G02B 23/12* (2006.01)
(Continued)

(52) U.S. Cl.
CPC ............. *G06T 7/579* (2017.01); *G01J 1/44* (2013.01); *G02B 23/12* (2013.01); *G06T 7/248* (2017.01); *G06T 7/262* (2017.01); *H04N 5/30* (2013.01); *G06T 2207/10032* (2013.01); *G06T 2207/20056* (2013.01); *G06T 2207/20221* (2013.01)

(58) Field of Classification Search
USPC ........................................................ 382/103
See application file for complete search history.

(56) References Cited

U.S. PATENT DOCUMENTS 6,542,250 B1 * 4/2003 Michaelis .......... G01B 11/2518
356/601
6,906,839 B2 6/2005 Gerchberg
(Continued)

OTHER PUBLICATIONS

Asteroid Occultation, http://www.poyntsource.com/Richard/.
(Continued)

*Primary Examiner* — Jerome Grant, II
(74) *Attorney, Agent, or Firm* — Endurance Law Group PLC

(57) ABSTRACT

A method of determining a silhouette of a remote object is disclosed herein. The method can include directing an array of telescopes at a star to sense an intensity of EM radiation over time and transmit signals corresponding to the intensity. The signals can be received at a computing device. Each signal can be indicative of a portion of an intensity diffraction pattern generated by an occlusion of the star by an occluding object. The signals can be combined to form a two-dimensional, intensity diffraction pattern. Each point on the intensity diffraction pattern associated with a time, a position of each telescope in the array, and an intensity of the sensed EM radiation. A silhouette of the occluding object can be determined based on the intensity diffraction pattern. A system for performing the method is also disclosed herein.

25 Claims, 6 Drawing Sheets

Related U.S. Application Data

(60) Provisional application No. 62/316,350, filed on Mar. 31, 2016.

(51) Int. Cl.
  *G06T 7/246* (2017.01)
  *G06T 7/262* (2017.01)

(56) References Cited

U.S. PATENT DOCUMENTS

| | | | |
|---|---|---|---|
| 7,092,103 B1 | 8/2006 | Kendrick et al. | |
| 7,113,268 B2 | 9/2006 | Gerwe et al. | |
| 7,343,098 B2 | 3/2008 | Gerwe et al. | |
| 7,483,569 B2 | 1/2009 | Bhagavatula et al. | |
| 7,920,673 B2 | 4/2011 | Lanza et al. | |
| 8,085,453 B2 | 12/2011 | Christmas et al. | |
| 8,189,095 B2 | 5/2012 | Gerwe | |
| 8,280,111 B2 | 10/2012 | Kukshya et al. | |
| 8,364,630 B1 | 1/2013 | Hunt et al. | |
| 8,755,564 B1 | 6/2014 | Kukshya et al. | |
| 8,861,893 B2 | 10/2014 | Chen et al. | |
| 8,995,787 B2 | 3/2015 | Poyneer et al. | |
| 2002/0148943 A1* | 10/2002 | Tatum | G01S 7/412 250/203.1 |
| 2006/0085159 A1* | 4/2006 | Itsuji | G06F 3/042 702/150 |
| 2007/0097004 A1* | 5/2007 | Sohfuku | G02B 23/16 343/757 |
| 2014/0347475 A1* | 11/2014 | Divakaran | G06K 9/00771 348/135 |
| 2015/0253428 A1* | 9/2015 | Holz | G01S 17/42 356/5.01 |
| 2016/0028968 A1* | 1/2016 | Affaticati | H04N 5/2723 348/47 |

OTHER PUBLICATIONS

Burns et al., "Shadow Imaging of GEO Satellites," Proc. of SPIE vol. 5896 58960C-8, downloaded from http://proceedings.spiedigitallibrary.org/ on Oct. 5, 2016 Terms of Use: http://spiedigitallibrary.org/ss/termsofuse.aspx.

Douglas, "Shadow Imaging of Geosynchronous Satellites," The University of Arizona, 2014, 277 pgs., downloaded from http://hdl.handle.net/10150/332833.

Fienup, J.R., "Phase retrieval algorithms: a comparison," Applied optics, vol. 21, No. 15, Aug. 1, 1982, pp. 2758-2769.

Jorgensen et al., "Interferometric Imaging of Geostationary Satellites: Signal-to-Noise Considerations," SPIE Astronomical Telescopes+ Instrumentation, (2012), 10 pgs.

Luu et al., "Shadow imaging efforts at MIT Lincoln Laboratory," MIT Lincoln Laboratory, 2008, pp. 1-11.

Paxman, et al. "Phase Retrieval with an Opacity Constraint", Signal Recovery and Synthesis, 1995 Technical Digest Series vol. 11, Mar. 14-15, 1995. pp. 109-111. (Optical Society of America, Washington DC, 1995).

Paxman, et al. "Silhouette Restoration", Computational Optical Sensing and Imaging, OSA Tech Digest (online) CM2C.4, Arlington VA, Jun. 2013, 3 pgs.

Paxman, et al. "Use of an opacity constraint in three-dimensional imaging", SPIE vol. 2241 Inverse Optics III (1994), pp. 116-126.

Paxman, et al., "Silhouette Estimation," J. Opt. Soc. Am. A, vol. 31, No. 7, Jul. 2014, pp. 1636-1644.

Paxman, R.G., "Superresolution with an Opacity Constraint", Signal Recovery and Synthesis III, Technical Digest Series 15, (Optical Society of America, Washington DC, 1989) PD1, North Falmouth, Cape Cod, MA, Jun. 1989, 5 pgs.

Rousset et al., "Imaging with multi-aperture optical telescopes and an application", Office national d'études et de recherches aérospatiales, http://www.researchgate.net/profile/Laurent_Mugnier/publication/238379708_Imaging_with_multiaperture_optical_telescopes_and_an_application/links/0046352e101e2aa26e000000.pdf.

Thurman et al., "Fourier transform imaging spectroscopy with a multiple-aperture telescope: band-by-band image reconstruction", TheInstitute of Optics, University of Rochester, http://www.optics.rochester.edu/workgroups/fienup/PUBLICATIONS/SPIE5487-68_FTISbbrec.pdf.

* cited by examiner

METHOD AND APPARATUS FOR IMAGING THE SILHOUETTE OF AN OBJECT OCCLUDING A LIGHT SOURCE USING A SYNTHETIC APERATURE

CROSS-REFERENCE TO RELATED APPLICATIONS

This continuation-in-part application claims the benefit of U.S. Provisional Patent Application Ser. No. 62/316,350 for a METHOD AND APPARATUS FOR IMAGING THE SILHOUETTE OF AN OBJECT OCCLUDING A LIGHT SOURCE USING A SYNTHETIC APERTURE, filed on Mar. 31, 2016, and U.S. Nonprovisional patent application Ser. No. 15/475,769 filed on Mar. 31, 2017, both of which are hereby incorporated by reference in their entirety.

BACKGROUND

1. Field

The present disclosure relates to novel data acquisition and image processing.

2. Description of Related Prior Art

The problem of ground-based fine-resolution imaging of geosynchronous satellites continues to be an important unsolved space-surveillance problem. If one wants to achieve 10 cm resolution at a range of 36,000 km at $\lambda=0.5$ µm via conventional means, then a 180 m diameter telescope with adaptive optics is needed (obviously prohibitively expensive). Disclosed is a passive-illumination approach that is radically different from amplitude, intensity, or heterodyne interferometry approaches. The approach, called Synthetic-Aperture Silhouette Imaging (SASI), produces a fine-resolution silhouette image of the satellite.

A silhouette is the image of an object represented as a solid shape of a single color (typically black) so that its edges match the object's outline. Silhouettes arise in a variety of imaging scenarios. These include images of shadows that are cast either on a uniform or a non-uniform but known background. Silhouettes also occur when an opaque object occludes a known background. This case is particularly evident when a bright background, such as the sun or the moon, is occluded by a relatively dark object, such as a satellite or an aircraft.

Various references reflect the state of the art in determining the silhouette of an object including (1) R. G. Paxman, D. A. Carrara, P. D. Walker, and N. Davidenko, "Silhouette estimation," JOSA A 31, 1636-1644 (2014); (2) J. R. Fienup, R. G. Paxman, M. F. Reiley, and B. J. Thelen, "3-D imaging correlography and coherent image reconstruction," in Digital Image Recovery and Synthesis IV, T. J. Schulz and P. S. Idell, eds., Proc. SPIE 3815-07 (1999); (3) R. G. Paxman, J. R. Fienup, M. J. Reiley, and B. J. Thelen, "Phase Retrieval with an Opacity Constraint in LAser IMaging (PROCLAIM)," in Signal Recovery and Synthesis, 1998 Technical Digest Series 11, 34-36 (Optical Society of America, Washington D.C., 1998); and (4) R. G. Paxman, "Superresolution with an opacity constraint," in Signal Recovery and Synthesis III, Technical Digest Series 15, (Optical Society of America, Washington D.C., 1989);

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of determining a silhouette of a remote object can include directing an array of telescopes at a star. Each telescope can be configured to sense an intensity of EM radiation over time and transmit a time-dependent signal corresponding to the intensity. The method can also include receiving, at a computing device having one or more processors, the respective signals from each of the telescopes. Each of the signals can be indicative of a portion of an intensity diffraction pattern generated by an occlusion of the star over a period of time by an occluding object. The method can also include combining, with the computing device, the respective signals received from the telescopes to form a two-dimensional, intensity diffraction pattern. Each point on the intensity diffraction pattern can be associated with a time, a position of each telescope in the array, and an intensity of the sensed EM radiation. The method can also include determining, with the computing device, a silhouette of the occluding object based on the intensity diffraction pattern.

A system for determining a silhouette of a remote object includes an array of telescopes and a computing device. The array of telescopes can be configured to be directed at a star. Each telescope is configured to sense an intensity of EM radiation over time and transmit a signal corresponding to the intensity. The computing device can have one or more processors and can be configured to receive the respective signals from each of the telescopes. Each of the signals can be indicative of a portion of an intensity diffraction pattern generated by an occlusion of the star over a period of time by an occluding object. The computing device can also be configured to combine the respective signals received from the telescopes to form a two dimensional, intensity diffraction pattern. Each point on the intensity diffraction pattern can be associated with a time, a position of each telescope in the array, and an intensity of the sensed EM radiation. The computing device can also be configured to determine a silhouette of the occluding object based on the intensity diffraction pattern.

BRIEF DESCRIPTION OF THE DRAWINGS

The detailed description set forth below references the following drawings.

DETAILED DESCRIPTION

Figure 1:
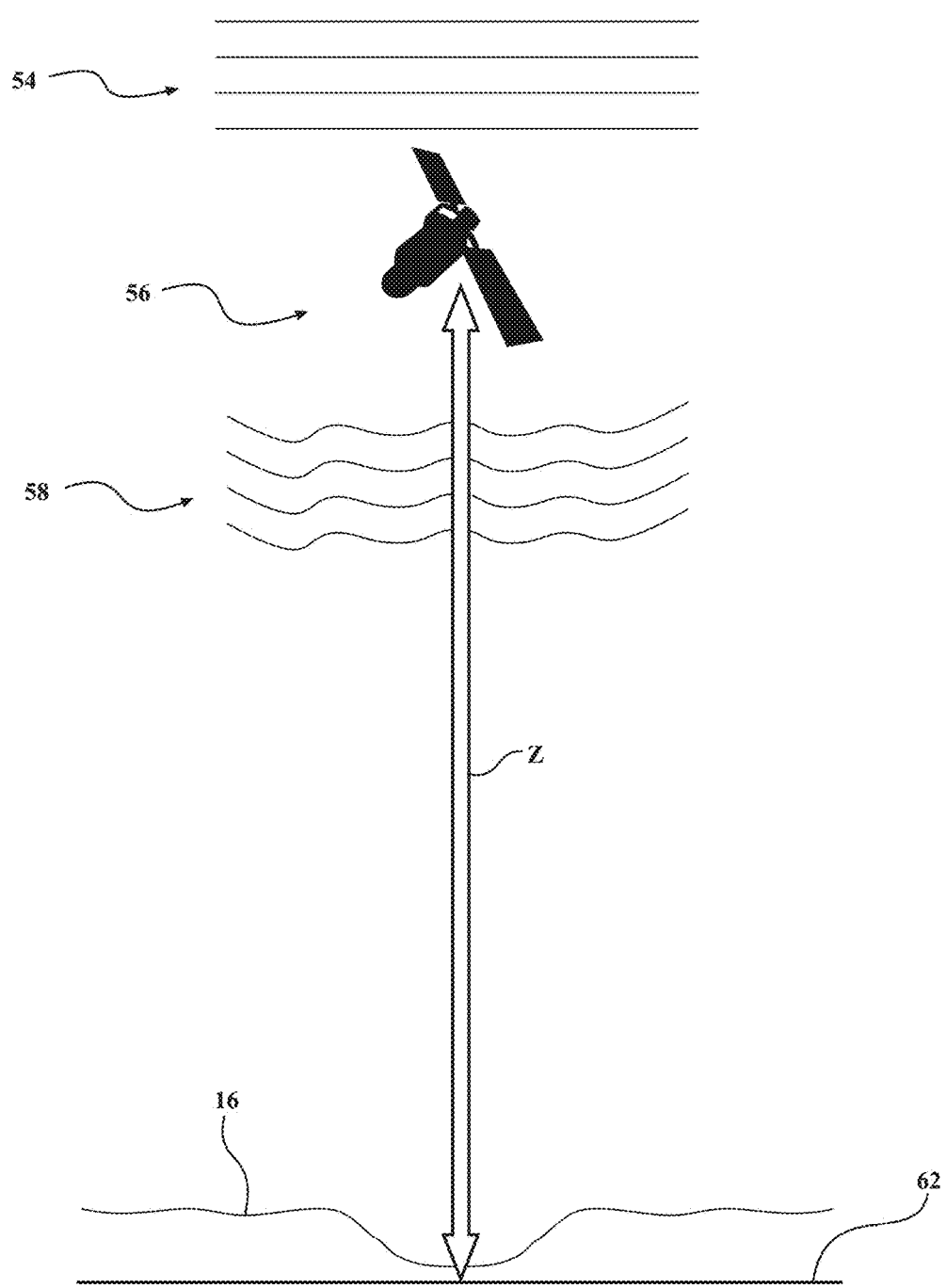
FIG. 1 is a depiction of how a far-field shadow or diffraction pattern is derived from an opaque object occluding light from a distant star.
Figure 2:
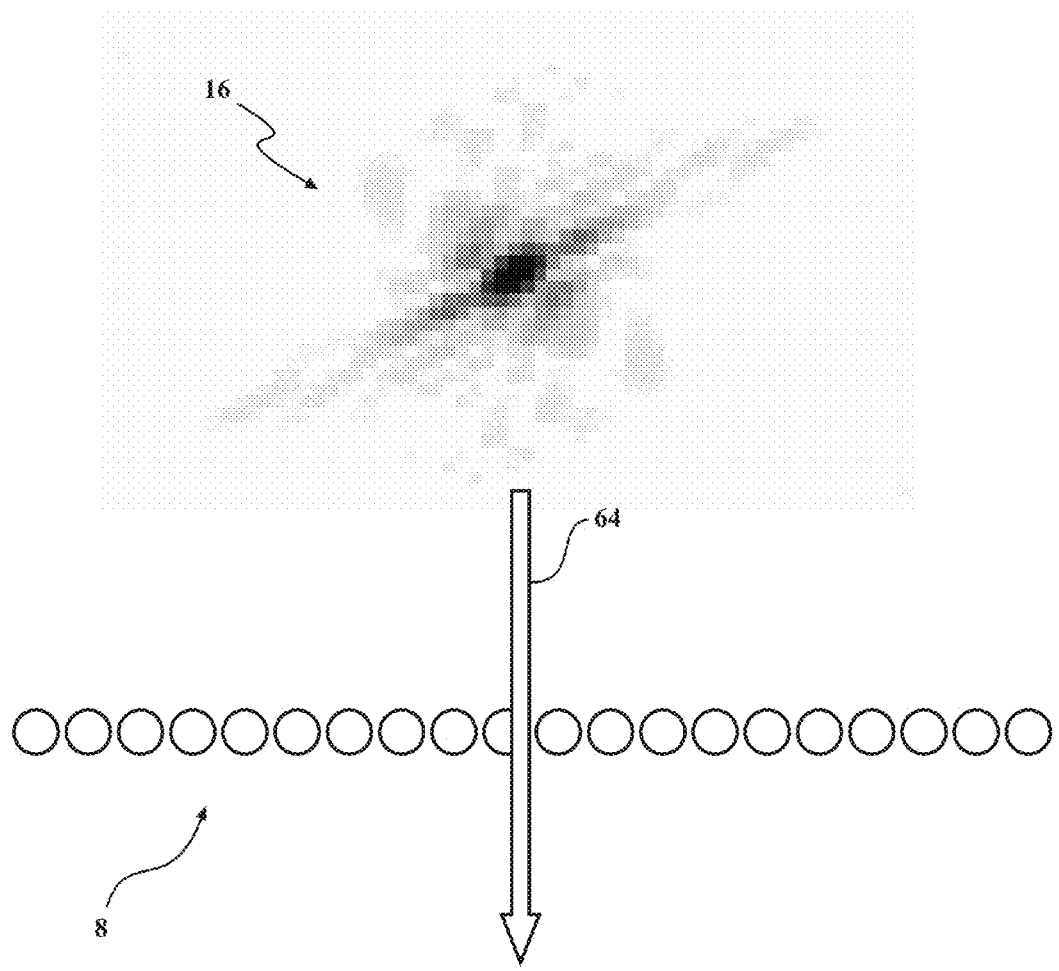
FIG. 2 shows a moving intensity diffraction pattern that traverses an array of telescopes.

The present disclosure, as demonstrated by the exemplary embodiments described below, can provide a passive-illumination approach to fine-resolution imaging of geosynchronous satellites and other objects. SASI produces a fine-resolution silhouette image of a satellite. When plane-wave radiation emanating from a bright star is occluded by a GEO satellite, then the light is diffracted and a moving diffraction pattern (shadow) is cast on the surface of the earth, as shown in FIG. 1. The plane wave radiation prior to occlusion is referenced at 54. The occluding satellite is referenced at 56. The diffracted wave resulting from occlusion is referenced at 58. A far-field shadow, the intensity diffraction pattern, is referenced at 16. The ground is referenced at 62 and the height of the satellite 56 is referenced by Z. With prior knowledge of the satellite orbit and star location, the track of the moving shadow can be predicted with high precision. A linear array of inexpensive hobby telescopes can be deployed roughly perpendicular to the shadow track to collect a time history of the star intensity as the shadow passes by, as shown in FIG. 2. The array is referenced in FIG. 2 at 8. The direction of travel on the ground of the moving shadow, or intensity diffraction pattern, relative to the stationary telescope array is referenced at 64. According to Babinet's principle, the shadow is the complement of the diffraction pattern that would be sensed if the occluding satellite were an aperture. If the satellite is small, then the Fraunhofer approximation is valid and the collected data can be converted to the silhouette's Fourier magnitude. A method according to the present disclosure also accommodates Fresnel diffraction in the case of larger satellites or satellites closer to the ground. A phase-retrieval algorithm, using the strong constraint that the occlusion of the satellite is a binary-valued silhouette (sometimes called an opacity constraint), allows retrieval of the missing phase leading to the reconstruction of a fine-resolution image of the silhouette.

The inventor has perceived that silhouettes of satellites can be highly informative, providing diagnostic information about deployment of antennas and solar panels, enabling satellite and antenna pose estimation, and revealing the presence and orientation of neighboring satellites in rendezvous and proximity operations. However, the current state of the art is not capable of capturing such information. In one embodiment of the present disclosure, a linear array of inexpensive (hobby) telescopes is placed on the ground in such a way that the diffraction pattern (or shadow) of the satellite, as the satellite occludes the star, passes perpendicular to the linear array. Each telescope tracks the star that will be occluded and has a field stop so that light from other stars does not affect the signal. Each telescope then collects a time-series signal of the occlusion. This can be done with a single (non-imaging) high-temporal-bandwidth photodetector. The time series from all telescopes must be synchronized temporally so that a two dimensional measurement of the intensity diffraction pattern can be constructed with temporal synthesis. The diffraction pattern can be used in conjunction with prior knowledge about a silhouette to retrieve a fine-resolution image of the silhouette.

The prior knowledge used is that a silhouette is binary valued and that it can be parameterized with a small number of parameters, relative to a conventional pixel parameterization. In the case of geosynchronous satellites that are sufficiently small, the diffraction pattern will tend to be a Fraunhofer pattern that is closely related to the pattern that one would get if the two-dimensional occluding function were an aperture (the complement of the occlusion) by use of Babinet's principle.

The intensity diffraction pattern is the magnitude squared of the Fourier expression for the silhouette. Note that atmospheric-turbulence-induced phase aberrations will have little or no effect on the recorded intensity diffraction pattern, so long as the star light is not refracted out of the field stop and light from other stars is not refracted into the field stop. Accordingly, the optical tolerances of the telescope can be relaxed.

The Fourier magnitude of the two-dimensional obscuration function is just the square root of the intensity diffraction pattern. Phase-retrieval (PR) methods can be utilized to restore the silhouette from the Fourier magnitude. An elementary iterative-transform PR algorithm is one approach.

Figure 3:
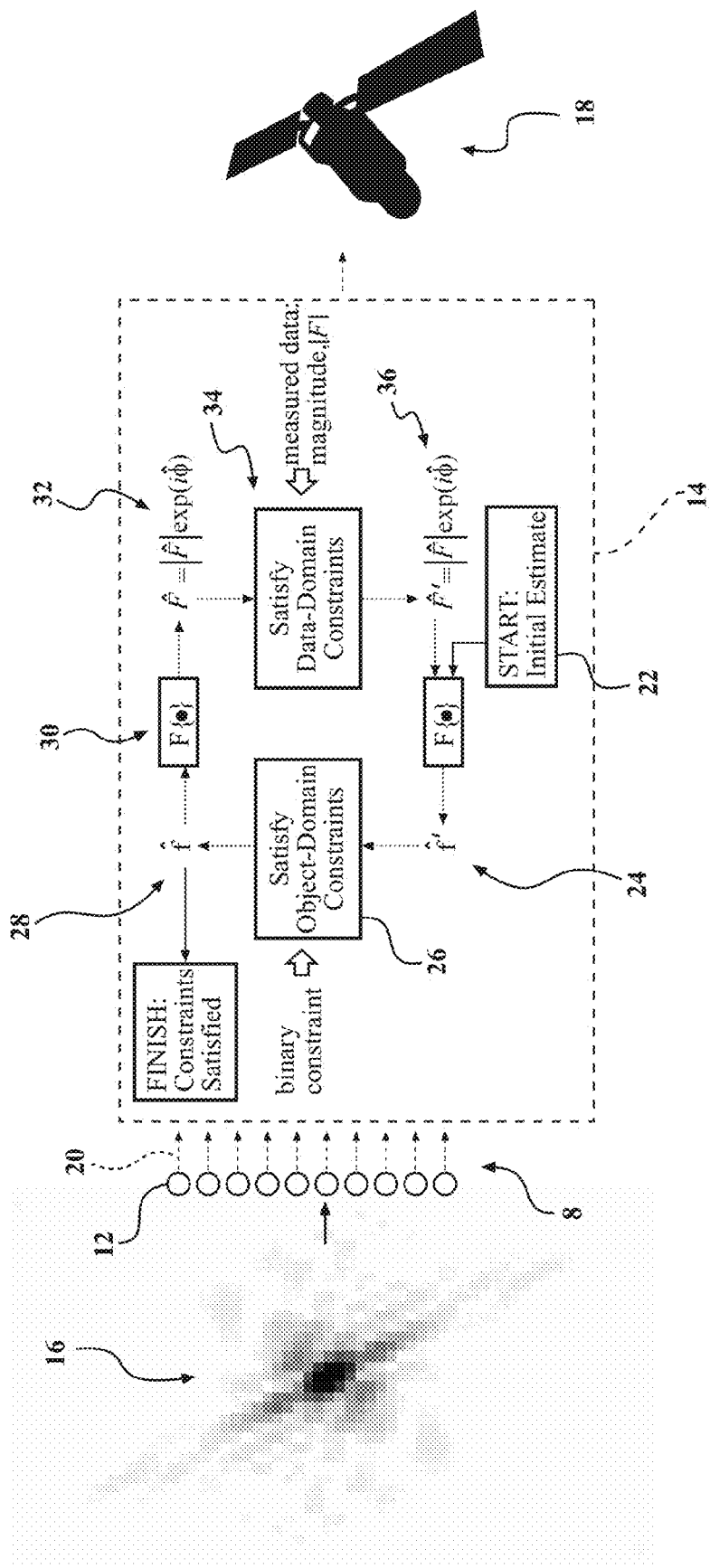
FIG. 3 is a schematic and simplified flow diagram of a method applied in an exemplary embodiment of the present disclosure.

Referring now to FIG. 3 an array 8 of telescopes, such as telescope 12 can be directed at a source of light, such as a star. Each telescope can include a photodetector transducer configured emit a signal corresponding to an intensity of sensed light, such as the signal referenced at 20. As set forth above, each telescope can also include a field stop so that light from other stars does not affect the signal that is emitted. All or less than all of the telescopes 12 can be hobby telescopes.

The array 8 can be one-dimensional, as shown in FIG. 3. The one-dimensional array 8 can be perpendicular to a path of movement of the shadow cast by an occluding object such as a satellite, the shadow defining the intensity diffraction pattern. Alternatively, in one or more embodiments of the present disclosure, the array 8 can be two-dimensional.

The array 8 of telescopes 12 can be stationary or can be relocatable. For ease of relocation, the array can be mounted on a moveable platform. For example, the array 8 can be positioned on a series of rail cars, on trucks, or on watercraft. The array 8 can be used to determine the silhouettes of multiple, occluding objects. Alternatively, the array 8 can used to determine the silhouette of a single object that occludes multiple stars.

In one or more embodiments of the present disclosure, the sensed EM radiation can be allocated to a plurality of spectral bins by each telescope 12. Each of the spectral bins would correspond to one of a plurality of wavelength bands. The EM radiation can be partitioned by using a dispersive element and a separate photodetector transducer for each spectral bin. A dispersive element can be positioned in each telescope 12. Also, a respective field stop can be positioned in each of the telescopes 12 to limit sensed EM radiation to EM radiation emitted by a single source.

The signals from each telescope can be received at a computing device having one or more processors. The computing device is represented schematically at 14. Each signal is indicative of an occlusion of the source of light over a period of time by an occluding object, such as a satellite.

The computing device 14 can be configured to combine the respective signals received from the telescopes to form an intensity diffraction pattern having dimensions including time, a position of the telescope in the array, and an intensity of the sensed EM radiation. Such a pattern is referenced at 16. Portions or bands of the pattern 16 extending in the horizontal direction and adjacent to one another along the vertical axis correspond to the respective signals receiving from each telescope. Portions or bands of the pattern 16 extending in the vertical direction and adjacent to one another along the horizontal axis correspond to the value of each of the respective signals at a moment in time. The computing device 14 can perform the operations illustrated within the dashed-line box 14 in FIG. 3 to reconstruct the discrete silhouette referenced at 18 from the pattern 16.

In one embodiment of the present disclosure, the array 8 of telescopes 12 is directed at a star as an object such as a satellite occludes the star. Each telescope 12 is configured to sense an intensity of EM radiation that is emitted by the star over time and transmit a signal corresponding to the intensity. The computing device 14 receives the respective signals from each of the telescopes 12. Each of the signals is indicative of a portion of an intensity diffraction pattern generated by the occlusion of the star by the occluding object. The computing device 14 combines the respective signals received from the telescopes 12 to form a two-dimensional, intensity diffraction pattern. The intensity diffraction pattern can be a Fresnel diffraction pattern or a Fraunhoffer diffraction pattern.

The pattern 16 represents a two-dimensional, intensity diffraction pattern. Each point on the intensity diffraction pattern is associated with a time, a position of each telescope 12 in the array 8, and an intensity of the sensed EM radiation. Time is differentiated along the horizontal direction of the pattern 16. The position of each telescope 12 in the array 8 is differentiated along the vertical direction of the pattern 16. The intensity of the sensed EM radiation is differentiated by relative darkness or brightness.

The computing device 14 can determine a silhouette of the occluding object, such as referenced at 18, based on the intensity diffraction pattern. The computing device 14 can derive an initial estimated complex-valued diffraction function in the data domain based on the intensity diffraction pattern. This is referenced at 22 in FIG. 3. A magnitude and a phase of each pixel of the initial estimated complex-valued diffraction function can be predetermined values or a random set of values. In one exemplary approach, the magnitude of the initial estimated complex-valued diffraction function can be derived directly from the measured intensity diffraction pattern and the corresponding phase can be randomly selected. The initial estimated complex-valued diffraction function can be the starting point for retrieving, with the computing device 14, a final estimated set of phase values by iterative-transform phase retrieval.

The computing device 14 can convert the initial estimated complex-valued diffraction function (or any subsequent then-current estimate of the complex-valued diffraction function) into an object-domain representation by one of inverse Fresnel transform and inverse Fourier transform. This is referenced at 24 in FIG. 3. The computing device 14 can then impose a predetermined binary constraint on each of the set of magnitudes of the object domain representation of the initial estimated complex-valued diffraction function (or the object domain representation of any subsequent then-current estimate of the complex-valued diffraction function). This is referenced at 26 in FIG. 3. The predetermined binary constraint can be that the magnitude of each pixel will be "1" (white) or "0" (black). In one exemplary approach, magnitudes of pixels of the object domain representation of the initial estimated complex-valued diffraction function (or the object domain representation of any subsequent then-current estimate of the complex-valued diffraction function) that are greater than 0.5 can be assigned a value of "1" and pixels that are less than 0.5 can be assigned a value of "0." The outcome of imposing the binary constraint is represented by f-hat, at 28.

The computing device 14 can next convert the initial or current object-domain representation (f-hat, at 28) into a subsequent estimate of the complex-valued diffraction function by one of forward Fresnel transform and forward Fourier transform. The conversion is referenced at 30 and the output of the conversion is referenced at 32 in FIG. 3. The output 32 is a complex-valued diffraction function, similar is nature to the initial estimated complex-valued diffraction function considered at 22.

The output 32 has a magnitude, the absolute value of F-hat. The computing device 14 can replace the magnitude of the output 32 (the subsequent estimate of the complex-valued diffraction function) with the magnitude of the initial estimated complex-valued diffraction function. The substitution operation is referenced at 34 and the output of the conversion is referenced at 36 in FIG. 3. The magnitude of the initial estimated complex-valued diffraction function can be the magnitude derived from the signals received by the telescopes. In such as an embodiment, the estimated portion of the initial estimated complex-valued diffraction function is the phase.

The computing device 14 can evaluate an objective function that quantifies the discrepancy between the current estimate and an acceptable solution. For example, the objective function can quantify the difference between the object-domain representation f-hat-prime, at 26, and that of f-hat, at 28. This discrepancy can be evaluated to determine if the computing device 14 should perform further iterations of the loop or cease silhouette-determining operations. Operations cease when the silhouette 18 has been determined. As one alternative, the objective function can quantify the difference between the data-domain representation F-hat, at 32, and F-hat-prime, at 36.

The computing device 14 includes one or more processors. The one or more processors can be configured to control operation of the computing device 14. It should be appreciated that the term "processor" as used herein can refer to both a single processor and two or more processors operating in a parallel or distributed architecture. For example, a first portion of the computing device 14 can be proximate to the array 8 of telescopes 12. The first portion can be configured to directly receive the signals and to communicate the signals over a network. A second portion of the computing device 14 can be remote from the array 8 of telescopes 12 and can be configured to receive the signals from the first portion over the network.

Embodiments of the present disclosure can apply compressive sensing (CS) to reduce the dimensions of the diffraction pattern detected by the array of telescopes. The knowledge selected for application to reduce dimensions is the object's orbit and opacity in transmission (binary-valued). The number of measurements is dramatically reduced because voluminous wavefront-sensing data are no longer needed and Fourier phase information is not needed. In addition, the number and cost of sensing elements are dramatically reduced.

This embodiment disclosed herein is an unconventional method for imaging within a family of imaging modalities called "occlusion imaging." The method can be practiced by hardware that is significantly less costly than hardware applied in conventional ground-based imaging. For example, the exemplary embodiment can achieve 10 cm resolution for a silhouette of a geosynchronous satellite; obtaining this degree of resolution using conventional methods would require an aperture on the ground to be roughly 180 m in diameter (for A=0.5 mm), considering only diffraction effects. This is over an order of magnitude larger than any telescope on the earth today. In addition, it would take a Herculean effort to adaptively correct for turbulence-induced aberrations for such a large telescope. Therefore, conventional ground-based imaging of geosynchronous satellites would be extremely expensive and even infeasible in the near term.

SASI produces a novel product, a fine-resolution silhouette, which can be quite informative for identification, pose estimation, etc. SASI fundamentally leverages extremely powerful prior knowledge to produce a result. The prior knowledge is that a silhouette is binary valued. In addition, silhouettes can be much more efficiently parameterized than by conventional pixel parameterization. These constraints are closely related to an "opacity" constraint. Further, SASI is a type of passive imaging, so it can collect silhouette images without being detected. SASI works even when the target (e.g. satellite or aircraft) doesn't provide a direct signal (such as when it is not illuminated by the sun). It is very difficult to construct counter measures for occlusion imaging.

In embodiments of the present disclosure, the optical tolerances of the telescopes can be relaxed and therefore the telescopes can be less costly. Atmospheric turbulence has little effect on the detected intensity diffraction pattern on the ground where the telescopes are positioned. Respective field stops in each telescope can eliminate signal contamination from light sources other than the occluded light source. Each telescope can function with a single non-imaging detector.

Silhouette estimation can involve an iterative-transform PR algorithm, as illustrated in FIG. 3. Alternatively silhouette estimation and phase retrieval can involve nonlinear optimization of an objective function, such as a log-likelihood function. Gradients can be computed through the use of algorithmic differentiation. Methods for global optimization can also be developed.

One or more embodiments of the present disclosure can be generalized to accommodate Fresnel diffraction which occurs when the occluding object is closer to the earth or when the occluding object is larger in extent. Also, one or more embodiments of the present disclosure can achieve improved signal-to-noise by using multiple spectral channels, by using telescopes with larger diameters, by using more telescopes (for example using multiple linear arrays), and/or by using multiple stars and multiple passes.

A variety of telescope-array geometries can be employed, including a linear array in which the diffraction pattern moves at any angle across the linear array (the more off perpendicular, the finer the cross-motion sampling of the pattern), multiple parallel linear arrays, hexagonally distributed arrays, or other spatially distributed array patterns. Additional noise immunity can be achieved by using efficient parameterizations, such as splines, instead of conventional pixel-parameterization for the silhouette image.

Figure 4A:
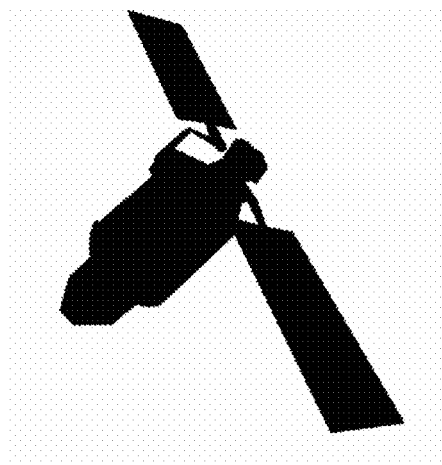
FIG. 4A is an image of a continuous silhouette.
Figure 4B:
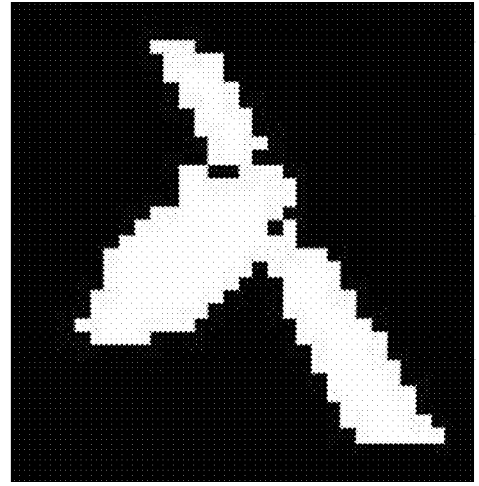
FIG. 4B is an image of a discretized complement, treated as truth.
Figure 4C:
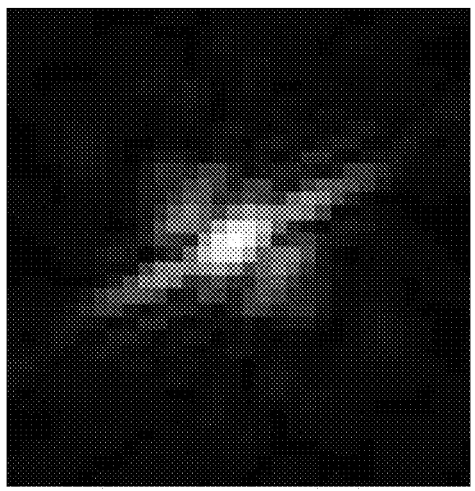
FIG. 4C is an image of a Fourier amplitude of FIG. 4B.
Figure 4D:
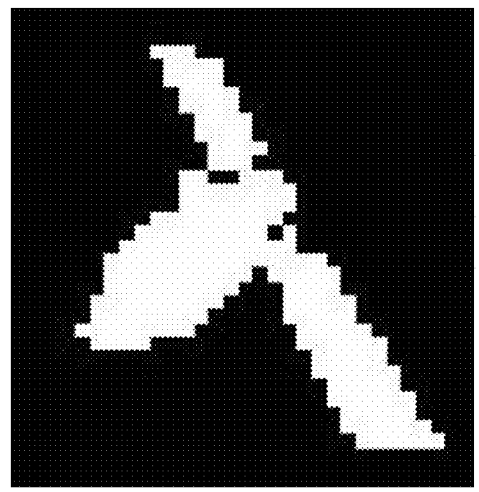
FIG. 4D is an image of an estimated object using phase retrieval.

A proof-of-concept simulation was performed to investigate the use of the opacity constraint in PR. A representative satellite silhouette was discretized and its complement was taken to serve as the truth image. Using the complement simplified simulation but retained the essential elements of a proof-of-concept evaluation. This image was then Fourier transformed, yielding a complex-valued image. Only the amplitude portion of this image was saved and treated as preprocessed noiseless data. The Fourier amplitude was then used in a simple iterative PR algorithm, as illustrated in FIG. 3. The results, shown in FIGS. 4A through 4D, show that the binary silhouette was retrieved perfectly. From FIGS. 4A through 4D it is clear that the opacity constraint works well for phase retrieval. FIG. 4A is an image of a continuous silhouette. FIG. 4B is the complement of a discretized version of 4A, treated as truth. FIG. 4C is an image of the Fourier amplitude of FIG. 4B. Fourier amplitude data can be estimated from the detected intensity diffraction pattern, in this simulation a Fraunhofer diffraction pattern. FIG. 4D is an image of an estimated object using the PR algorithm of FIG. 3.

Figure 5B:
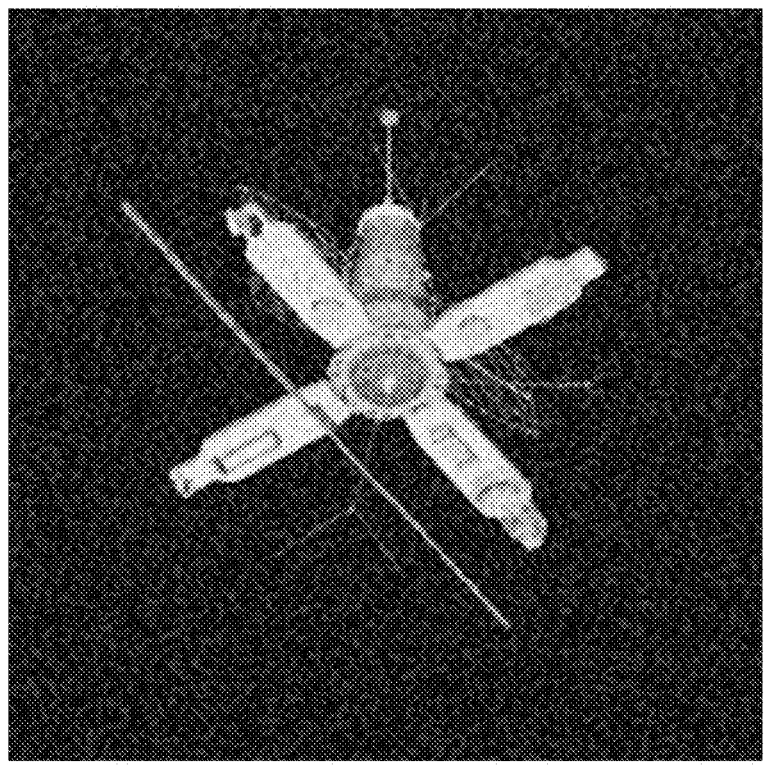
FIG. 5B is a noisy gray-scale image corresponding to FIG. 5A.
Figure 5A:
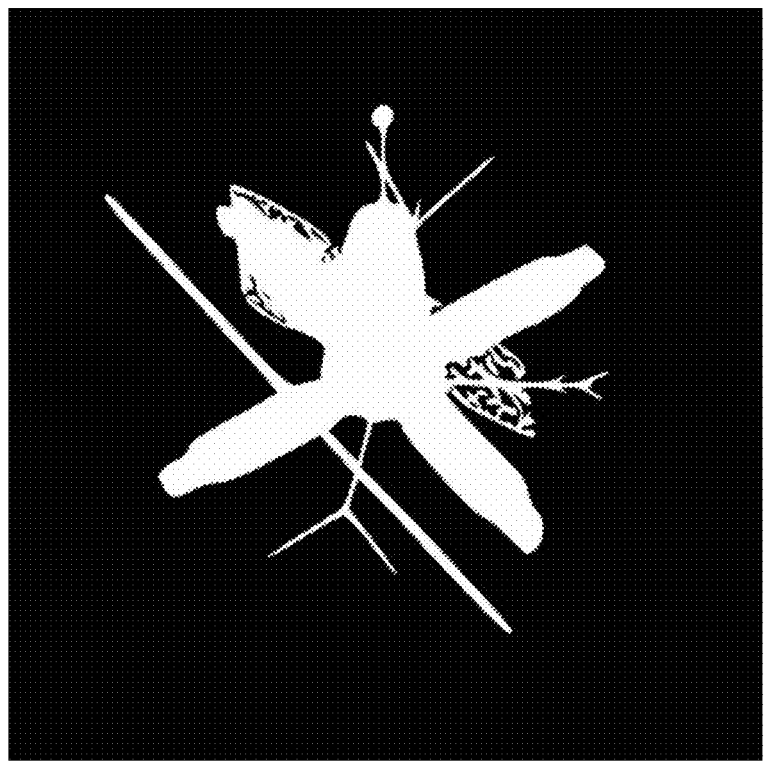
FIG. 5A is a fine-resolution silhouette.

The opacity constraint is potent and will be noise tolerant. This is partly because a silhouette image is sparse relative to its gray-level counterpart. As an example, the fine-resolution silhouette shown in FIG. 5A is efficiently characterized with spline parameters as opposed to pixel values. A noisy gray-scale image corresponding to FIG. 5A is shown in FIG. 5B. The image of FIG. 5A is highly informative and complements the gray-scale image of FIG. 5B. Even though the silhouette of FIG. 5A is highly articulated, the spline rendering represents a compression factor of 22.5 relative to its counterpart gray-level image. Clearly, it is easier to estimate fewer parameters in the presence of noise.

Figure 6:
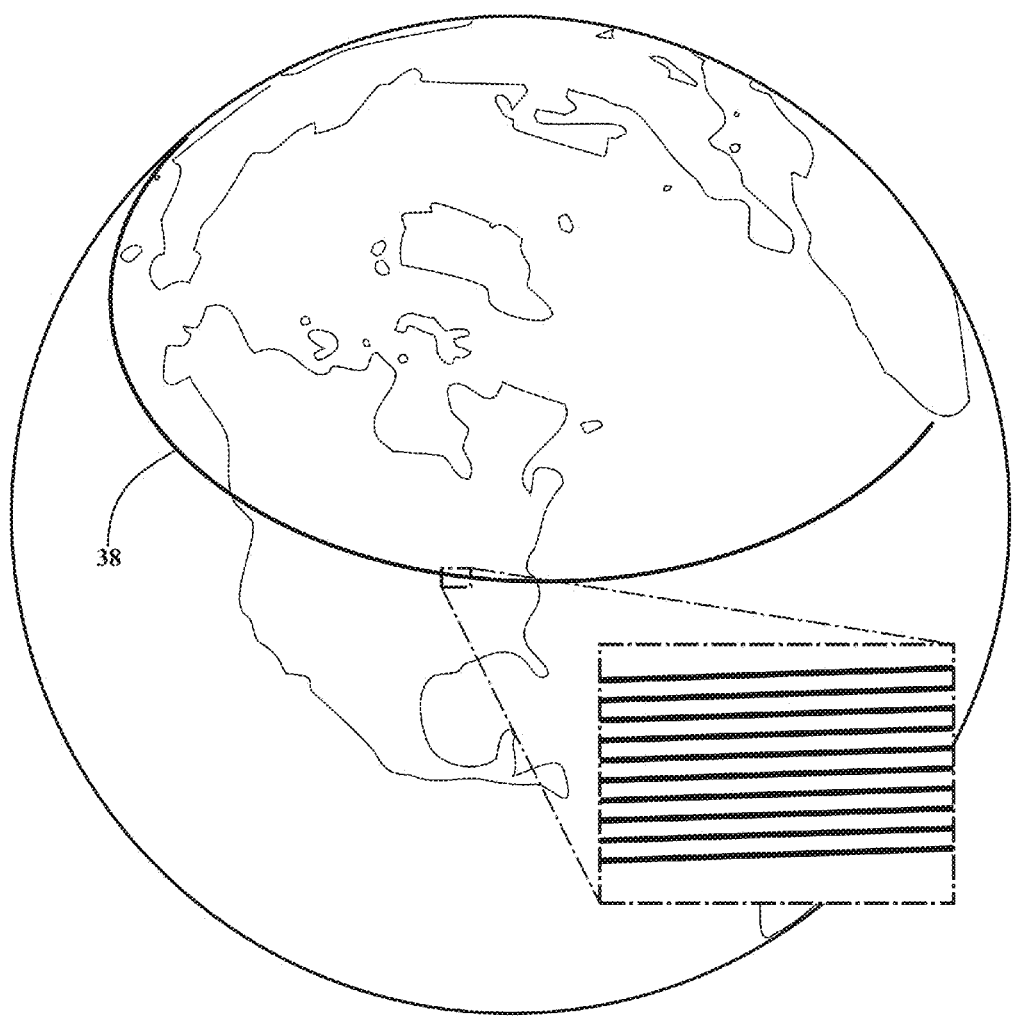
FIG. 6 is a perspective view of an exemplary shadow track cast by the star Zeta Ophiuchi and a representative satellite.

Another consideration for SASI is access to star shadows cast by a given GEO satellite. This is a complicated problem that involves the satellite orbit, the earth's rotation, the time of year, and selecting from a list of sufficiently bright stars. The inventor has learned how to map a star/satellite-shadow track on the earth's surface using AGI's STK. An example shadow track cast by the star Zeta Ophiuchi and a representative, occluding satellite is referenced at 38 in FIG. 6. The moving shadow traverses this track (the semi-circle shown) in about 47 minutes. The track cuts through the center of the CONUS, as well as portions of the Pacific and Atlantic oceans, all during the night. Note that the track will change from day to day. The detail in FIG. 6 shows the track for 10 consecutive days, which migrates roughly 1 mile in latitude daily. These plots suggest a wide variety of geographic and temporal choices for site selection, including the option for daily monitoring of a high-interest satellite by using the same stars with only modest relocation.

Fortunately, shadow tracks are precisely predictable for known satellites so that a relocatable observing system can be accurately prepositioned to capture the shadow signature. A collection plan for a specific satellite can be formulated by evaluating candidate shadow tracks from differing stars on different days to find a region suitable for deployment. Relocation could be achieved with rail cars (using a roughly north/south abandoned rail system), with a convoy of trucks having telescopes mounted in the beds, or with a repurposed cargo ship for ocean access. Note that the SASI signal will be relatively insensitive to ship motion.

Alternatively, telescopes can be deployed in a fixed (stationary) installation. In this case, daily tasking of the telescope array for a given satellite can be planned by selecting from a catalog stars for which the star-satellite shadow tracks pass through the fixed array.

The telescopes in the SASI array can literally be hobby telescopes, each with a low-cost APD detector. The telescopes need to be deployed in a linear array that spans the desired effective diameter, say 180 m. The linear array provides a two-dimensional data set via temporal synthesis. The telescope/sensor modules are identical, enabling economies of scale. Each telescope tracks the designated star and collects its time history with the aid of a field stop and a single APD detector. Signals must be detected at kHz bandwidths and must be synchronized to millisecond accuracy, which is easy to accommodate. The hardware described is simple and inexpensive relative to other approaches. The expense for operations, including possible relocation of the array, is manageable.

Because one or more embodiments of the present disclosure can collect an indirect signal provided by satellite occlusion, there is no limit to how faint the satellite can be under direct observation. In fact, SASI works well for unilluminated satellites (in the earth's shadow) or satellites with low optical signature. Further, one or more embodiments of the present disclosure can could be used to detect the silhouette of asynchronous satellites (i.e. not geosynchronous) or even other non-orbiting objects (e.g. aircraft). It is difficult to countermeasure occlusion.

SASI is insensitive to turbulence effects. SASI indirectly measures Fourier (or Fresnel) amplitude, which is insensitive to turbulence-induced aberrations, so long as the turbulence is near the pupil. This obviates the need for complicated phase-tracking and wavefront-sensing instrumentation.

Whereas other methods may need extended observation of a target to build sufficient signal, the SASI acquisition is extremely quick. For one representative geometry, the star shadow travels at a speed of 2.6 km/sec. This means that the entire acquisition can take place in about 1/10th of a second.

Multiple silhouettes can be collected from different aspects. These silhouettes can then be used to construct a 3D visual hull of the satellite. Silhouettes also complement gray-level images, providing information about regions of the satellite not illuminated.

The method can also be used when multiple stars appear in the field-of-view of the system, such as in the case wherein binary stars or star clusters, for which multiple stars are closely spaced in angle, are used. In this case, the satellite will occlude multiple stars and multiple intensity diffraction patterns will be detected by the SASI system. For a given wavelength, the multiple intensity diffraction patterns will have the same pattern but will be shifted with a known shift corresponding to the angular position of the multiple stars. These shifted intensity diffraction patterns will be overlaid when detected. The detected signal of overlaid patterns can be used to estimate the satellite silhouette.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A method of determining a silhouette of a remote object comprising:
   directing an array of telescopes at a star wherein each telescope is configured to sense an intensity of EM radiation over time and transmit a signal corresponding to the intensity;
   receiving, at a computing device having one or more processors, the respective signals from each of the telescopes, each of the signals indicative of a portion of an intensity diffraction pattern generated by an occlusion of the star over a period of time by an occluding object;
   combining, with the computing device, the respective signals received from the telescopes to form a two-dimensional, intensity diffraction pattern with each point on the intensity diffraction pattern associated with a time, a position of each telescope in the array, and an intensity of the sensed EM radiation; and
   determining, with the computing device, a silhouette of the occluding object based on the intensity diffraction pattern.

2. The method of claim 1 wherein the intensity diffraction pattern is a Fresnel diffraction pattern.

3. The method of claim 1 wherein the intensity diffraction pattern is a Fraunhoffer diffraction pattern.

4. The method of claim 1 wherein at least some of the telescopes are hobby telescopes.

5. The method of claim 4 wherein all of the telescopes are hobby telescopes.

6. The method of claim 1 further comprising:
   deriving, with the computing device, an initial estimated complex-valued diffraction function in the data domain based on the intensity diffraction pattern, wherein a magnitude and a phase of each pixel of the initial estimated complex-valued diffraction function are each of one of a predetermined and a random set of values.

7. The method of claim 6 wherein said determining further comprises:
   retrieving, with the computing device, a final estimated set of phase values by nonlinear-optimization-based iterative phase retrieval beginning with the initial estimated complex-valued diffraction function.

8. The method of claim 6 wherein said determining further comprises:
   retrieving, with the computing device, a final estimated set of phase values by iterative-transform phase retrieval beginning with the initial estimated complex-valued diffraction function.

9. The method of claim 8 wherein said determining further comprises:
   converting, with the computing device, a current estimate of the complex-valued diffraction function into an object-domain representation by one of inverse Fresnel transform and inverse Fourier transform; and
   imposing, with the computing device, a predetermined binary constraint on each of the set of magnitudes of the object domain representation of the current estimate of the complex-valued diffraction function.

10. The method of claim 9 wherein said determining further comprises:
    converting, with the computing device after said imposing, a current object-domain representation into a subsequent estimate of the complex-valued diffraction function by one of forward Fresnel transform and forward Fourier transform; and
    replacing, with the computing device, the magnitude of the subsequent estimate of the complex-valued diffraction function with the magnitude of the initial estimated complex-valued diffraction function.

11. The method of claim 10 wherein the predetermined binary constraint is further defined as being one of two alternative values, wherein said imposing is further defined as replacing each value in the set of magnitudes of the object-domain representation with one of the two alternative values.

12. The method of claim 8 wherein said determining further comprises:
evaluating, with the computing device, an objective function that quantifies a discrepancy between current values of magnitude during the iterative-transform phase retrieval and a predetermined value.

13. The method of claim 12 wherein the discrepancy is further defined as between the set of magnitudes of a current object-domain representation and a predetermined binary constraint.

14. The method of claim 12 wherein the discrepancy is further defined as between the set of magnitudes of a current complex-valued diffraction function with the magnitude of the initial estimated complex-valued diffraction function.

15. The method of claim 1 further comprising:
allocating the sensed EM radiation to a plurality of spectral bins each corresponding to one of a plurality of wavelengths; and
partitioning the EM radiation by using a dispersive element and a separate photodetector transducer for each spectral bin.

16. The method of claim 1 further comprising:
positioning a respective field stop in each of the telescopes to limit sensed EM radiation to EM radiation emitted by the source.

17. The method of claim 1 wherein said directing comprises:
directing a one-dimensional array of telescopes at the star wherein each telescope includes a photodetector transducer configured to detect the signal corresponding to the intensity of the sensed EM radiation.

18. The method of claim 17 further comprising:
arranging the one-dimensional array of telescopes to be approximately perpendicular to a path of movement of the intensity diffraction pattern.

19. The method of claim 1 wherein said directing further comprises:
directing a two-dimensional array of telescopes at the source.

20. The method of claim 1 further comprising:
positioning the array of telescopes on a moveable platform.

21. The method of claim 1 wherein the occluding object is a satellite orbiting the Earth.

22. The method of claim 1 further comprising:
directing the array of telescopes at a second star wherein each telescope is configured to sense an intensity of EM radiation over time and transmit a signal corresponding to the intensity of the second star;
receiving, at the computing device, the respective signals associated with the second star from each of the telescopes, each of the signals associated with the second star indicative of a portion of an intensity diffraction pattern associated with the second star generated by an occlusion of the second star over a period of time by an occluding object;
combining, with the computing device, the respective signals associated with the second star received from the telescopes to form a two-dimensional, intensity diffraction pattern associated with the second star with each point on the intensity diffraction pattern associated with the second star defined by a time, a position of each telescope in the array, and an intensity of the sensed EM radiation; and
determining, with the computing device, a silhouette of the occluding object based on the intensity diffraction pattern associated with the star and on the intensity diffraction pattern associated with the second star.

23. A system for determining a silhouette of a remote object comprising:
an array of telescopes configured to be directed at a star wherein each telescope is configured to sense an intensity of EM radiation over time and transmit a signal corresponding to the intensity; and
a computing device having one or more processors and configured to receive the respective signals from each of the telescopes, each of the signals indicative of a portion of an intensity diffraction pattern generated by an occlusion of the star over a period of time by an occluding object, said computing device also configured to combine the respective signals received from the telescopes to form a two dimensional, initial intensity diffraction pattern with each point on the initial intensity diffraction pattern associated with a time, a position of each telescope in the array, and an intensity of the sensed EM radiation, and said computing device also configured to determine a silhouette of the occluding object based on the intensity diffraction pattern.

24. The system of claim 23 wherein said computing device further comprises:
a first portion being proximate to said array of telescopes and configured to directly receive the signals and to communicate the signals over a network; and
a second portion being remote from said array of telescopes and configured to receive the signals from said first portion over the network.

25. The system of claim 24 wherein:
said array comprises a plurality of telescopes arranged in at least one row; and
said computing device is further defined as configured to reconstruct the silhouette of the occluding object from the sensed intensity of the EM radiation over time through the use of a phase-retrieval algorithm in the form of a nonlinear-optimization-based phase retrieval.

* * * * *